(12) United States Patent
Park

(10) Patent No.: US 7,756,498 B2
(45) Date of Patent: Jul. 13, 2010

(54) CHANNEL ESTIMATOR AND METHOD FOR CHANGING IIR FILTER COEFFICIENT DEPENDING ON MOVING SPEED OF MOBILE COMMUNICATION TERMINAL

(75) Inventor: Soo-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 492 days.

(21) Appl. No.: 11/834,346

(22) Filed: Aug. 6, 2007

(65) Prior Publication Data

US 2008/0268783 A1 Oct. 30, 2008

(30) Foreign Application Priority Data

Aug. 8, 2006 (KR) ...................... 10-2006-0074915

(51) Int. Cl.
*H04B 1/18* (2006.01)

(52) U.S. Cl. ............... 455/185.1; 455/186.1; 455/114.2; 455/278.1; 455/296; 375/350; 375/147; 375/262; 375/368; 342/99; 342/84; 381/94.2; 381/17; 348/683; 358/463; 367/94; 324/132; 600/454; 708/320

(58) Field of Classification Search .............. 455/114.2, 455/278, 296, 185.1, 186.1; 375/350, 368, 375/262, 147; 370/488; 342/99, 84; 381/94.2, 381/17; 348/683; 358/463; 367/94; 324/132; 382/26; 600/454; 708/320

See application file for complete search history.

(56) References Cited

U.S. PATENT DOCUMENTS

| 5,943,427 | A | * | 8/1999 | Massie et al. .................. 381/17 |
| 6,049,577 | A | * | 4/2000 | Gothe et al. ................ 375/368 |
| 6,055,318 | A | * | 4/2000 | Whitecar ................... 381/94.2 |
| 6,263,354 | B1 | * | 7/2001 | Gandhi ....................... 708/320 |
| 6,907,143 | B2 | * | 6/2005 | Ferguson ................... 382/261 |
| 7,230,975 | B2 | | 6/2007 | Subrahmanya et al. |
| 7,376,210 | B2 | * | 5/2008 | Kim et al. ................... 375/350 |
| 7,539,166 | B2 | * | 5/2009 | Do et al. ..................... 370/335 |
| 7,602,845 | B2 | * | 10/2009 | Alessandro ................. 375/232 |
| 2004/0076185 | A1 | * | 4/2004 | Kim et al. ................... 370/488 |

FOREIGN PATENT DOCUMENTS

CN 1555638 12/2004
KR 1020060031118 4/2006

* cited by examiner

*Primary Examiner*—Matthew D Anderson
*Assistant Examiner*—April G Gonzales
(74) *Attorney, Agent, or Firm*—The Farrell Law Firm, LLP

(57) ABSTRACT

Disclosed is a channel estimator and a method for changing a coefficient of an IIR filter depending on a moving speed of a mobile communication terminal. In the channel estimator, a coefficient changing unit receives I and Q signals from a current base station, and selects a coefficient of the IIR filter optimized depending on the moving speed of the current mobile communication terminal. The coefficient changing unit sets the selected coefficient of the IIR filter to the IIR filter of the channel estimator. Accordingly, it is possible to prevent the performance degradation of the channel estimator caused by the speed of the mobile communication terminal.

6 Claims, 4 Drawing Sheets

CHANNEL ESTIMATOR AND METHOD FOR CHANGING IIR FILTER COEFFICIENT DEPENDING ON MOVING SPEED OF MOBILE COMMUNICATION TERMINAL

PRIORITY

This application claims priority under 35 U.S.C. §119(a) to an application entitled "Channel Estimator And Method For Changing IIR Filter Coefficient Depending On Moving Speed of Mobile Communication Terminal" filed in the Korean Industrial Property Office on Aug. 8, 2006 and assigned Serial No. 2006-74915, the contents of which are hereby incorporated by reference.

BACKGROUND OF THE INVENTION

1. Field of the Invention

The present invention relates to a channel estimator for use in a mobile communication terminal, and more particularly to a channel estimator using an Infinite Impulse Response (IIR) filter.

2. Description of the Related Art

Generally, a channel estimator is used for estimating a channel prediction value in order to compensate for a fading channel. A $3^{rd}$ Generation Partnership Project (3GPP) physical channel used in the channel estimator includes a Common Pilot Channel (CPICH). In a general case, a Primary CPICH (P-CPICH) is used, and in a case of specified purpose, a Secondary CPICH (S-CPICH) is used for a Physical Downlink Shared Channel (PDSCH) and a Dedicated Physical Channel (DPCH).

In such a configuration of the channel estimator, a Finite Impulse Response (FIR) filter or IIR filter may be used. FIG. 1 is a block diagram illustrating the configuration of the channel estimator in which the IIR filter 102 is used. Referring to FIG. 1, the channel estimator begins its operation on a frame boundary of a CPICH, and sums I and Q signals by 256 chip, which is a spreading factor of the CPICH, in an Integration and Dump (I&D) unit 100, resulting in the obtaining of a channel prediction value for the currently received input signal.

The channel estimator enables this value to pass through the IIR filter 102, and obtains a channel prediction value (Ant_out_I 108, Ant_out_Q 110) which effects the signal received by each antenna undergoes. Here, the IIR filter 102 reduces noise using the channel prediction value which effects the currently received input signal. As a result, the noise can be estimated by using the channel prediction value. Specifically, the channel prediction value can be obtained by summing the spreading factors of the I and Q signals. When the sum of the spreading factors is compared with the spreading factor without an error, the amount of noise currently occurring can be determined. For example, in the case of a communication system in which the spreading factor of the CPICH spreads the I signal or the Q signal by 256 chip, it is possible to estimate the value of noise occurring in a channel from which the current I signal or Q signal is transmitted, according to the differences between the sum and the value without an error, i.e. '256'.

The relation between the input and output of the IIR filter 102 can be expressed by Equation (1), and a transfer function in the IIR filter 102 can be expressed by Equation (2). The frequency-characteristic function of the IIR filter 102 can be obtained by substituting $e^{jw}$ with Z in Equation (2), as expressed by Equation (3):

$$y(n)=b_0 \cdot x(n)+a_1 \cdot y(n-1) \qquad (1)$$

$$H(e^{jw}) = \frac{b_0}{1 - a_1 \cdot e^{-jw}} \qquad (2)$$

$$H(Z) = \frac{Y(Z)}{X(Z)} = \frac{b_0}{1 - a_1 \cdot Z^{-1}} \qquad (3)$$

In the conventional channel estimator using the IIR filter 102, when the rate of the mobile communication terminal is rapid, to the effect of a fading channel or a Doppler effect more frequently occurs. For example, when the mobile communication terminal passes through a region in which the fading channel or the Doppler effect exists, noise caused by the fading channel or the Doppler effect more frequently occurs. Accordingly, there is a problem in that the performance of the channel estimator can be degraded according to the moving speed of the mobile communication terminal.

In this case, in order to compensate for the degraded performance of the channel estimator, the coefficients set to the IIR filter 102, i.e. values of $a_1$ 104 and $b_0$ 106, should be suitably set depending on the moving speed of the mobile communication terminal, thereby preventing the performance degradation of the channel estimator. However, in the conventional channel estimator, since only the coefficients $b_0$ 106, $a_1$ 104 based on a preset default value are set for the IIR filter 102, there is a problem in that it is difficult to prevent the performance degradation caused by the moving speed of the mobile communication terminal.

SUMMARY OF THE INVENTION

Accordingly, the present invention has been made to solve at least the above-mentioned problems occurring in the prior art, and the present invention provides an apparatus and method for preventing the performance degradation of a channel estimation unit caused by the moving speed of a mobile communication terminal.

Further, the present invention provides an apparatus and method for preventing the performance degradation of a channel estimating unit by selecting a IIR filter coefficient optimized for the a moving speed of a mobile communication terminal.

In accordance with an aspect of the present invention, there is provided a channel estimator which includes an Integration and Dump (I&D) unit for receiving spread I and Q signals and summing spreading factors of the spread I and Q signals; a coefficient changing unit for receiving the I and Q signals in which the spreading factors are summed, selecting and outputting optimized coefficient values based on a current moving speed of a mobile terminal; and an Infinite Impulse Response (IIR) filter for receiving the I and Q signals, in which the spreading factors are summed, and the optimized coefficients, and performing IIR filtering depending on the input coefficient in order to output a channel prediction value of the summed I and Q signals.

In accordance with another aspect of the present invention, there is provided a method for changing an IIR filter coefficient caused by the moving speed of a mobile communication terminal, which includes sequentially selecting a pair of coefficients from pairs of preset coefficients; receiving I and Q signals in which spreading factors are summed, in order to perform an IIR filtering through an IIR filter to which the pair of selected coefficients are input, and outputting a channel prediction result value depending on the pair of currently selected coefficients; storing a result of the IIR filtering, channel prediction result values being stored according to the pairs of sequentially selected coefficients; and comparing the stored channel prediction result values with the channel prediction values without noise in order to set the pair of coefficients according to the channel prediction result value with the smallest difference, as coefficients of the IIR filter.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
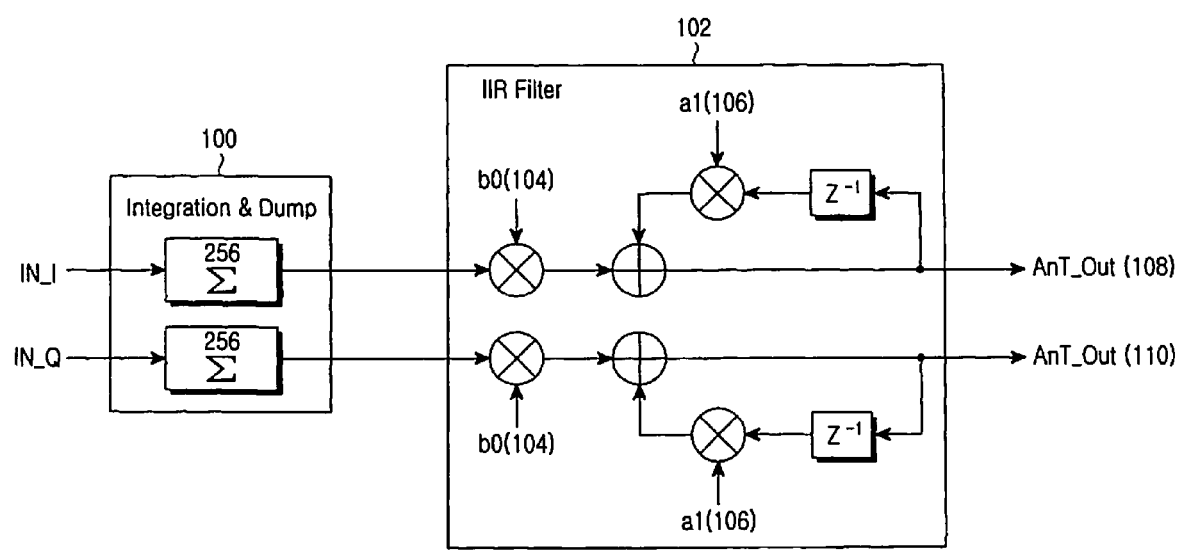
FIG. 1 is a block diagram illustrating the configuration of a conventional channel estimator.

Hereinafter, the exemplary embodiment of the present invention will be described in detail with reference to the accompanying drawings. The same reference numerals denote identical structural elements throughout all the drawings. In the following description of the present invention, a detailed description of known functions and configurations incorporated herein will be omitted when it may make the subject matter of the present invention rather unclear.

In a channel estimator according to the exemplary embodiment of the present invention, a coefficient changing unit receives an I signal and a Q signal from the current base station and selects an optimized IIR filter coefficient depending on a moving speed of the mobile communication terminal. The coefficient changing unit sets the selected IIR filter coefficient for the IIR filter of the channel estimator. Therefore, the present invention can prevent the performance degradation of the channel estimator caused by the speed of the mobile communication terminal.

Figure 2:
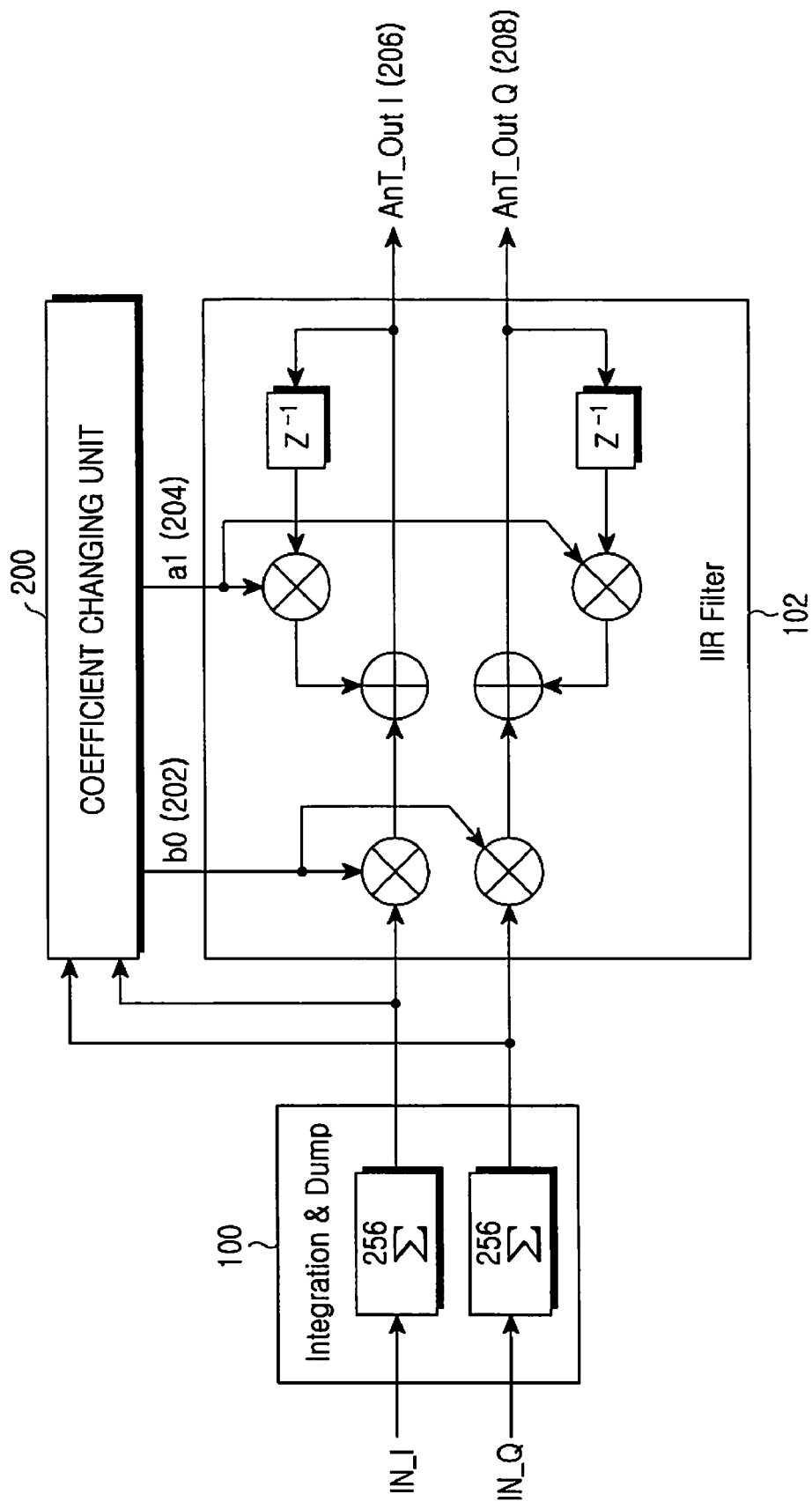
FIG. 2 is a block diagram illustrating the configuration of a channel estimator according to the exemplary embodiment of the present invention.

FIG. 2 is a block diagram illustrating the configuration of the channel estimator according to the exemplary embodiment of the present invention.

Referring to FIG. 2, the channel estimator includes an integration and dump (I&D) unit 100, an IIR filter 102, and a coefficient changing unit 200 for receiving an input signal I and an input signal Q summed by the I&D unit 100, selecting a coefficient corresponding to the speed of the current mobile communication terminal, and changing coefficients set for the IIR filter 102 according to the selected coefficient. The coefficient changing unit 200 selects a pair of coefficients corresponding to the speed of the mobile communication terminal from plural pairs of set coefficients which are set in advance resulting from experimental data resulting from experiments for determining the optimized coefficients according to the speed of the mobile communication terminal. Such pairs of preset coefficients are expressed as an example in a Table 1.

TABLE 1

| $a_1$ | $B_0 (= 1 - a_1)$ | moving speed |
|---|---|---|
| 1/4 | 3/4 | 1000 km/h |
| 1/2 | 1/2 | 700 km/h |
| 3/4 | 1/4 | 100 km/h |
| 7/8 | 1/8 | 50 km/h |
| 15/16 | 1/16 | 10 km/h |

In this case, the coefficient changing unit 200 selects coefficient values of the optimized IIR filter depending on the current moving speed, for example, a pair of coefficients of $a_1$ or $b_0$, and then sets them as $a_1$ 204 and $b_0$ 202. Thus, the IIR filter 102 is optimized depending on the moving speed of the mobile communication terminal. As a result, an antenna output signal passing through the IIR filter 102 can have channel estimation values Ant_out_I 206, Ant_out_Q 208 optimized according to the moving speed of the mobile communication terminal. Therefore, the present invention can prevent the performance degradation of the channel estimator.

Figure 3:
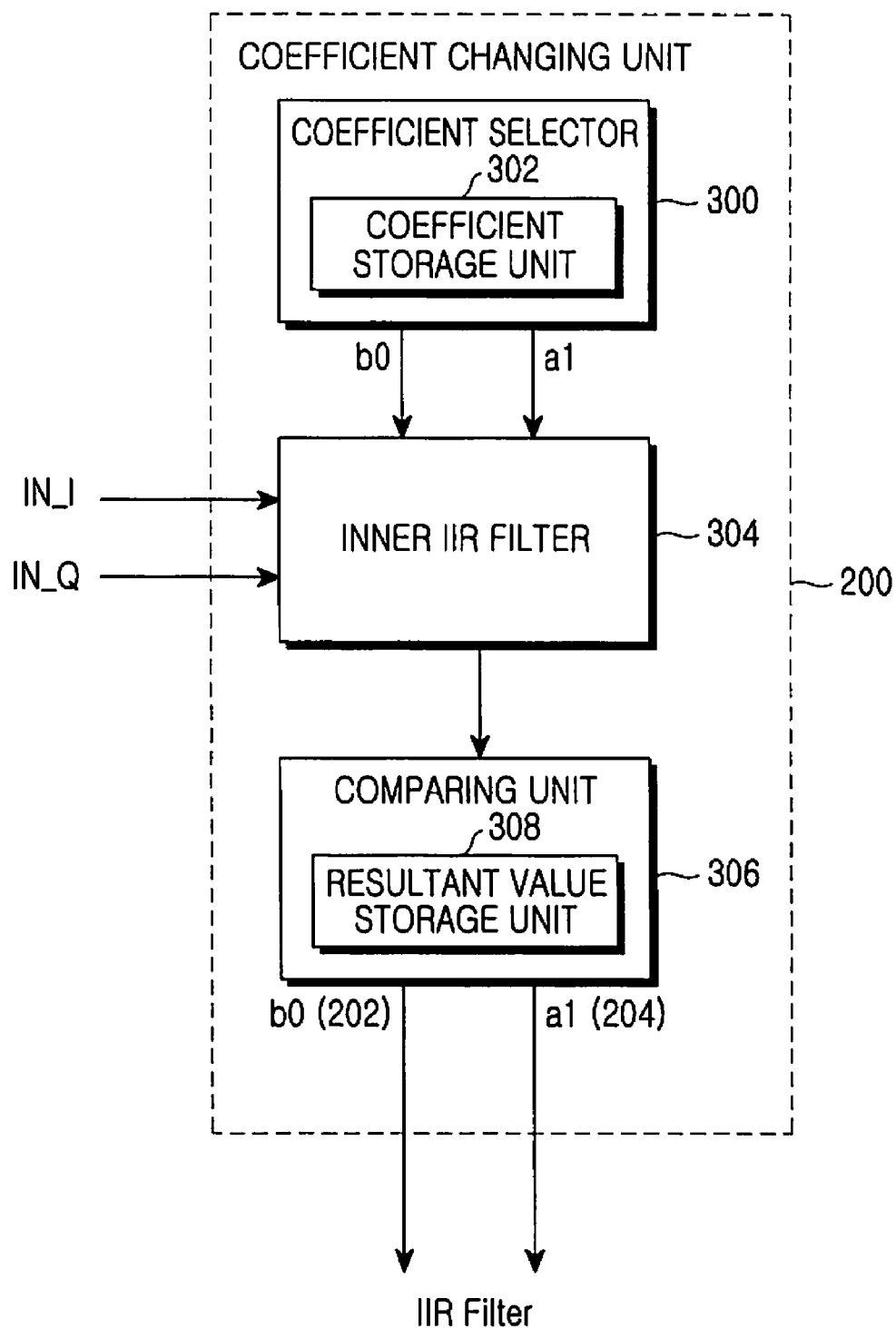
FIG. 3 is a block diagram illustrating the configuration of a coefficient changing unit in the channel estimator according to the exemplary embodiment of the present invention.

FIG. 3 is a block diagram illustrating the detailed configuration of the coefficient changing unit in the channel estimator according to the exemplary embodiment of the present invention.

Referring to FIG. 3, the coefficient changing unit 200 of the channel estimator includes a coefficient storage unit 302 for storing pairs of preset coefficients listed in Table 1, a coefficient selector 300 for selecting a stored coefficients stored in the coefficient storage unit 302, an inner IIR filter 304 for checking if the coefficients selected by the coefficient selector 300 are optimized to correspond to the moving speed of the mobile communication terminal, a resulting value storage unit 308 for storing channel prediction result values, and a comparing unit 306 for comparing the stored result values to determine an optimized pair of coefficients.

The coefficient storage unit 302 may include the coefficient selector 300. The coefficient selector 300 selects and outputs a pair of coefficients from the pairs of coefficients stored in the coefficient storage unit 302 according the preset order. The preset order is determined depending on the moving speed of the mobile communication terminal, i.e. the order from the highest speed to the lowest speed, or from the lowest speed to the highest speed of the mobile communication terminal. In the case where the channel prediction value of the pair of current output coefficients is stored, the coefficient selector 300 selects and outputs the pair of coefficients depending on the preset order.

The inner IIR filter 304 is a structural element for applying the pair of coefficients input from the coefficient selector 300 to the actual IIR filter. Specifically, the inner IIR filter 304 is an operation element which receives the I signal and the Q signal, spreading factors of which are summed, from the I&D unit 100, and sets the coefficient input from the coefficient selector 300 to perform IIR filtering. The inner IIR filter 304 may be not required in the case of separately outputting the prediction result value depending on the pair of coefficients output from the coefficient selector 300 from the actually output channel prediction value Ant_out_I 206, Ant_out_Q 208. In this case, the pair of coefficients output from the coefficient selector 300 is output to the IIR filter 102, and the resulting value storage unit 308 stores the channel prediction result value output depending on the pair of coefficients.

If the channel prediction result value is output from the inner IIR filter 304, the result value storage unit 308 stores the channel prediction result value. The channel prediction result value is output as the value which is obtained by filtering the sum of the spreading factors of I signal or Q signal through the IIR filter 304. Therefore, the channel prediction result value is determined by the coefficients set by the IIR filter 102, i.e. the coefficients output from the coefficient selector 300.

In addition, the comparing unit 306 checks if the channel prediction result value is output depending on the pair of coefficients preset to the coefficient selector 300. If the channel prediction result values relating to all pairs of preset coefficients are output, the channel prediction result values are compared with one another. Specifically, the channel prediction result values are compared with a value without noise, i.e. '256' and a pair of coefficients approximated to the value of '256' is selected. The pair of selected coefficients is output to the IIR filter 102. As a result, the coefficients $a_1$ 204, $b_0$ 202 of the IIR filter 102 are changed into the coefficients output from the coefficient changing unit 200, and thereby the channel prediction values Ant_out_I 206, Ant_out_Q 208 can be optimized to correspond to the moving speed of the mobile communication terminal. In this case, it is possible to prevent the performance degradation of the channel estimating unit.

Figure 4:
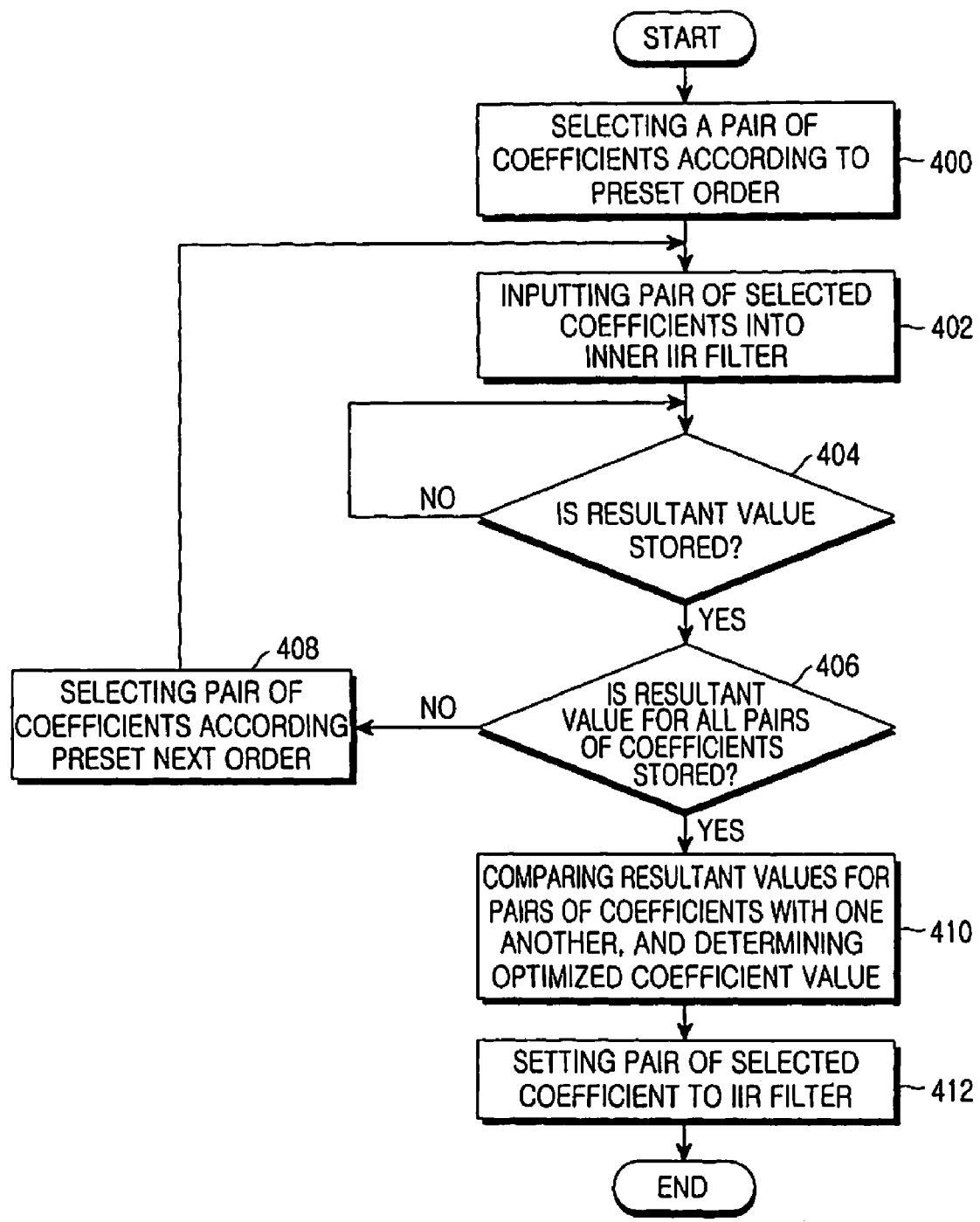
FIG. 4 is a flowchart illustrating the operation of changing coefficient in the coefficient changing unit according to the exemplary embodiment of the present invention.

FIG. 4 is a flowchart illustrating the operation of changing the coefficient in the coefficient changing unit according to the exemplary embodiment of the present invention.

Referring to FIG. 4, the coefficient changing unit 200 proceeds to step 400 and selects a pair of coefficients according to the currently preset order. The preset order is determined based on the speed listed in Table 1.

The coefficient changing unit 200 proceeds to step 402, and inputs the pair of currently selected coefficients into the inner IIR filter 304. The inner IIR filter 304 filters the I and Q signals passing through the inner I&D unit 100 based on the input pairs of coefficients and outputs the channel prediction result value according to the pair of currently input coefficients. The coefficient changing unit 200 proceeds to step 404 and identifies if the IIR filtering is completed based on the pair of coefficients input into the inner IIR filter 304 and of the storing of the channel prediction result value is completed. If completed, the coefficient changing unit 200 proceeds to step 406, and checks if the resulting values for all pairs of preset coefficients are stored in the coefficient storage unit 302.

As a result of step 406, if the resulting values for all pairs of coefficients are not stored, the coefficient changing unit 200 proceeds to step 408 and selects a pair of coefficients in accordance with a next order preset by the coefficient selector 300. Then, the coefficient changing unit 200 proceeds to step 402 in order to input the pair of currently selected coefficients into the inner IIR filter 304, and performs steps 402 to 406 repeatedly.

As a result of step 406, however, if the resulting values for all pairs of coefficients are stored, the coefficient changing unit 200 proceeds to step 410 in order to compare the stored channel prediction result value with the channel prediction value without noise based on each pair of coefficients, and determines the pair of coefficients with smallest difference as the optimized coefficients. Here, if the communication system of the current mobile communication terminal spreads the I signal or the Q signal by 256 chip of the spreading factor of CPICH, the channel prediction value without the noise may be '256'.

The coefficient changing unit 200 sets the optimized coefficients, which are currently determined, to the IIR filter 102. For example, a pair of coefficients in which $a_1$ is ⅞ and $b_0$ is ⅛ is set to the optimized coefficients in Table 1, the coefficient changing unit 200 sets $a_1$ and $b_0$ to ⅞ and ⅛ in the IIR filter 102, respectively, in step 412. Accordingly, the channel estimating unit according to the exemplary embodiment of the present invention changes the coefficients depending on the moving speed of the mobile communication terminal, thereby preventing the performance degradation of the channel estimating unit caused by the speed of the current mobile communication terminal.

Accordingly, the present invention selects and sets the IIR filter coefficient optimized to the moving speed of the current mobile communication terminal, thereby preventing the performance degradation of the channel estimating unit.

Although the exemplary embodiment of the present invention is described in which the optimized coefficients are found through the IIR filtering according to a plurality of pairs of coefficients and are set, of course, the present invention may further include a structural unit for actually measuring the speed so as to set the coefficients depending on the measured speed. If it is possible to measure the speed of the mobile communication terminal through the channel prediction values Ant_out_I 206, Ant_out_Q 208 and other values, of course, it is possible to change and set the coefficient to the IIR filter, depending on the speed measured with such a method.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A channel estimator of a mobile communication terminal, the channel estimator comprising:

an Integration and Dump (I&D) unit for receiving spread I and Q signals and summing spreading factors of the received I and Q signals;

a coefficient changing unit for receiving the I and Q signals in which the spreading factors are summed, respectively, performing Infinite Impulse Response (IIR) filtering using pairs of preset coefficients, outputting channel prediction result values according to the used pairs of preset coefficients, comparing the channel prediction result values with a channel prediction value in which noise does not occur, and selecting and outputting optimized coefficient values, which are a pair of coefficients corresponding to a channel prediction result value having a smallest difference from the channel prediction result value; and an first Infinite Impulse Response (IIR) filter for receiving the I and Q signals in which the spreading factors are summed, respectively, receiving the optimized coefficients, and performing IIR filtering based on the received coefficient values in order to output a channel prediction value for the summed I and Q signals in which the spreading factors are summed, respectively.

2. The channel estimator of claim 1, wherein the coefficient changing unit includes:

a coefficient storage unit for storing the pairs of preset coefficients;

a coefficient selector for selecting a pair of coefficients from the pairs of preset coefficients;

an second IIR filter for receiving the I and Q signals, in which the spreading factors are summed, respectively, from the I&D unit, and outputting the channel prediction result value based on the pair of current selected coefficients;

a result value storage unit for storing the output channel prediction result value; and a comparing unit for comparing the channel prediction result values stored in the result value storage unit with the channel prediction value in which noise does not occur, and setting to the first IIR filter a pair of coefficients corresponding to a channel prediction result value having the smallest difference from the channel prediction value.

3. The channel estimator of claim 2, wherein the first IIR filter performs IIR filtering based on a pair of coefficients output from the coefficient selector, and outputs to the result value storage unit a channel prediction result value based on the IIR-filtered pair of coefficients.

4. The channel estimator of claim 2, wherein the pairs of preset coefficients are distinguished from one another according to the speed of the mobile terminal provided with the channel estimator.

5. A method for changing an IIR filter coefficient of an IIR filter according to the moving speed of a mobile terminal, the method comprising the steps of:

sequentially selecting a pair of coefficients from pairs of preset coefficients according to a predetermined order;

receiving I and Q signals in which spreading factors are summed, respectively, performing an IIR filtering through an second IIR filter to which the pair of selected coefficients are input, and outputting a channel prediction result value based on the IIR-filtered pair of coefficients;

storing a result of the IIR filtering, channel prediction result values being stored according to the pairs of coefficients; and comparing the stored channel prediction result values with the channel prediction values without noise and setting a pair of coefficients corresponding to a channel prediction result value having the smallest difference from the channel prediction value, as coefficients of the first IIR filter.

6. The method as claimed in claim 5, wherein the pairs of preset coefficients are distinguished from one another depending on the speed of the mobile terminal.

* * * * *